(12) United States Patent
Itoh

(10) Patent No.: US 8,015,609 B2
(45) Date of Patent: Sep. 6, 2011

(54) WORM INFECTION DETECTING DEVICE

(75) Inventor: Jun Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1186 days.

(21) Appl. No.: 11/300,661

(22) Filed: Dec. 12, 2005

(65) Prior Publication Data
US 2007/0079378 A1    Apr. 5, 2007

(30) Foreign Application Priority Data

Sep. 30, 2005 (JP) ................................. 2005-287957

(51) Int. Cl.
*H04L 29/14* (2006.01)
(52) U.S. Cl. ............................... 726/23; 726/24; 713/188
(58) Field of Classification Search .............. 726/22–26; 717/126–131, 176, 171
See application file for complete search history.

(56) References Cited

U.S. PATENT DOCUMENTS

| | | | | | |
|---|---|---|---|---|---|
| 5,313,616 | A | * | 5/1994 | Cline et al. ..................... | 717/127 |
| 5,870,607 | A | * | 2/1999 | Netzer .......................... | 717/127 |
| 6,275,937 | B1 | * | 8/2001 | Hailpern et al. .............. | 713/188 |
| 7,174,333 | B2 | | 2/2007 | Yamada et al. | |
| 7,281,270 | B2 | * | 10/2007 | Piesco et al. .................... | 726/25 |
| 2002/0056076 | A1 | * | 5/2002 | Made ............................ | 717/129 |
| 2002/0078368 | A1 | * | 6/2002 | Yann et al. .................... | 713/200 |
| 2002/0138755 | A1 | * | 9/2002 | Ko ................................. | 713/201 |
| 2003/0115479 | A1 | * | 6/2003 | Edwards et al. .............. | 713/200 |
| 2003/0200464 | A1 | * | 10/2003 | Kidron .......................... | 713/201 |
| 2004/0019886 | A1 | * | 1/2004 | Berent et al. .................. | 717/158 |
| 2004/0255165 | A1 | * | 12/2004 | Szor .............................. | 713/201 |
| 2005/0039029 | A1 | * | 2/2005 | Shipp ............................ | 713/188 |
| 2005/0108562 | A1 | * | 5/2005 | Khazan et al. ................ | 713/200 |
| 2005/0204346 | A1 | * | 9/2005 | Davies .......................... | 717/127 |
| 2005/0283838 | A1 | * | 12/2005 | Saito ............................ | 726/24 |
| 2006/0101413 | A1 | | 5/2006 | Kinno et al. | |

FOREIGN PATENT DOCUMENTS

| | | |
|---|---|---|
| JP | 5-342023 | 12/1993 |
| JP | 9-269930 | 10/1997 |
| JP | 2002-163111 | 6/2002 |

(Continued)

OTHER PUBLICATIONS

Gong, C. et al. 'More Pratical Approach for Single-Packet IP Tracbrack Using Packet Logging and Marking'. IEEE Transactions on Parallel and Distributed Systems, Oct. 2008, vol. 19, No. 10, pp. 1310-1324. (abstract) IEEE [online]. [retrieved on Aug. 6, 2009]. Retreived from: IEEE Xplore.*

(Continued)

*Primary Examiner* — Minh Dinh
*Assistant Examiner* — Venkat Perungavoor
(74) *Attorney, Agent, or Firm* — Fujitsu Patent Center

(57) ABSTRACT

When a program consisting of a plurality of processes is installed in a device, its processing route in the case where the processes normally advance is built as a database, based on the knowledge of a program designer or the like. When the program is executed, routing information indicating the actual process flow along each process flow is generated. Before a new process is activated, the route till then is compared with the correct route stored in the database. If the route till then is abnormal, it is determined that the device is infected with a worm, and the communication port of a device in which the program is installed is cut off and the maintenance terminal is notified of the abnormality.

15 Claims, 10 Drawing Sheets

FOREIGN PATENT DOCUMENTS

| | | |
|---|---|---|
| JP | 2003-241989 | 8/2003 |
| JP | 2006-53788 | 2/2006 |
| WO | WO-2004/075060 | 9/2004 |

OTHER PUBLICATIONS

Yaar, A. et al. 'Pi: A Path Identification Mechanism to Defens against DDoS Attacks'. IEEE proceedings of the 2003 IEEE Symposium on Security and Privacy, 2003, pp. 1-15. (abstract) IEEE[online].[retrieved on Aug. 6, 2009]. Retreived from: IEEE Xplore.*

Al-Duwairi, B. et al. 'Topology Based Packet Marking'. IEEE, 2004, pp. 146-151.(abstract) IEEE[online].[retrieved on Aug. 6, 2009]. Retrieved from IEEE Xplore.*

IEEE Xplore Search Notes.*

Simkhada et al. Differencing Worm Flows and Normal Flows for Automatic Generation of Worm Signatures. Proceedingsa of the Seventh IEEE International Symposium on Multimedia(Mar. 2005).*

"Japanese Office Action", mailed by JPO and corresponding to Japanese application No. 2005-287957 on Mar. 8, 2011, with partial English translation.

* cited by examiner

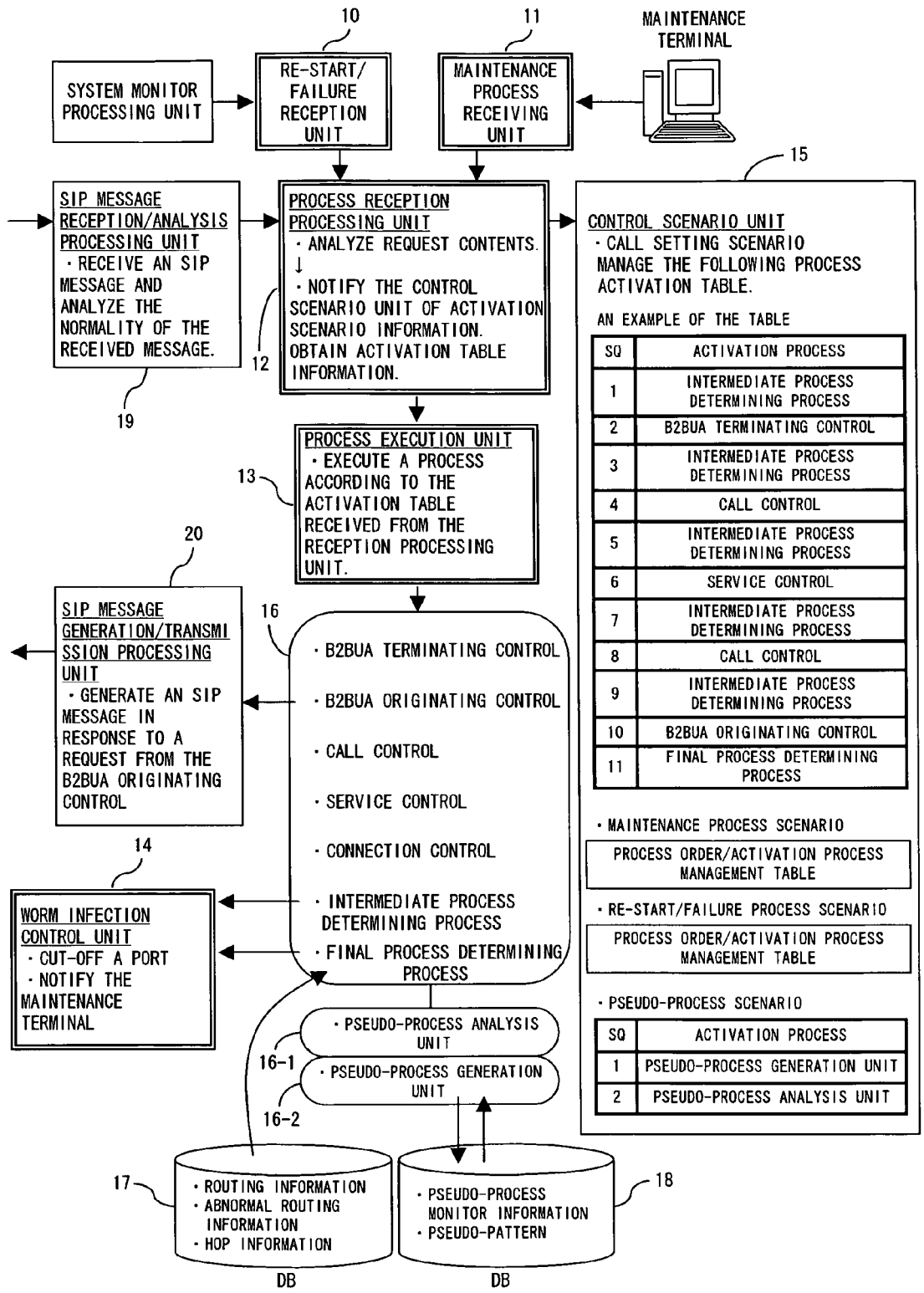
F I G. 1

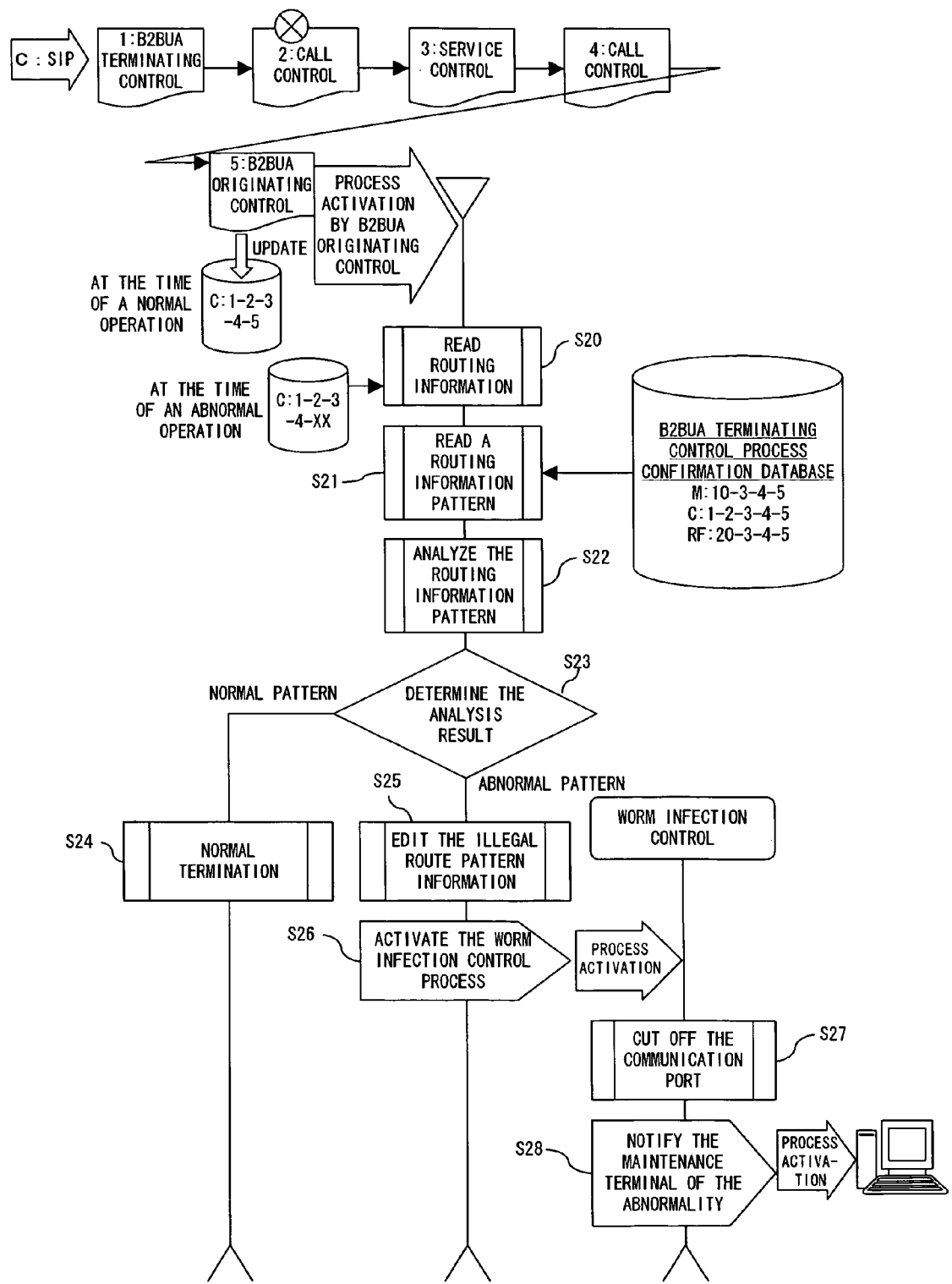
F I G. 4

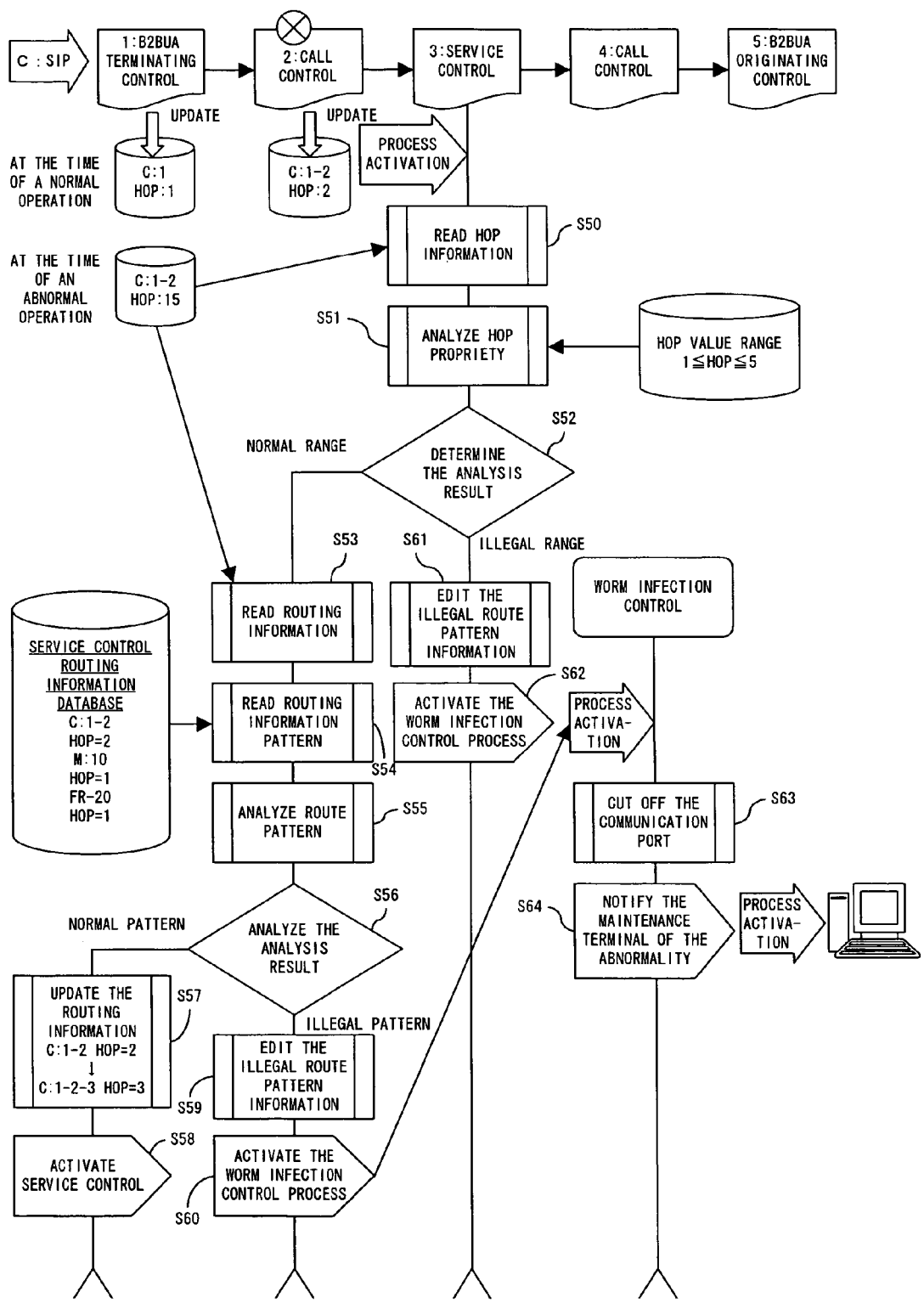
F I G. 7

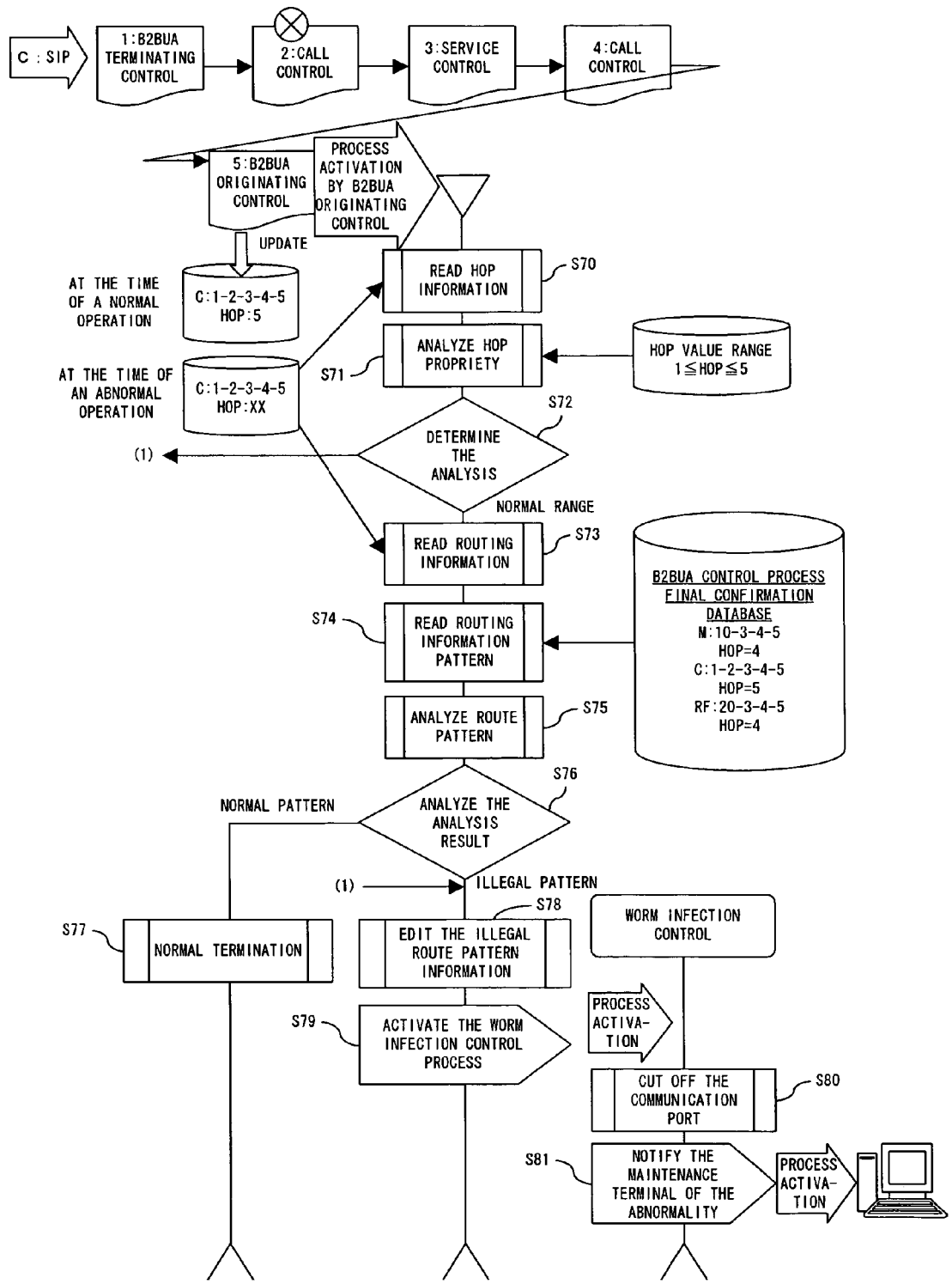
F I G. 8

WORM INFECTION DETECTING DEVICE

CROSS-REFERENCE TO RELATED APPLICATIONS

This application is based upon and claims the benefit of priority from the prior Japanese Patent Application No. 2005-287957 filed on Sep. 30, 2005, the entire contents of which are incorporated herein by reference.

BACKGROUND OF THE INVENTION

1. Field of the Invention

The present invention relates to a device for detecting a device infected with a worm via a network.

2. Description of the Related Art

Recently, with the spread of networks using an IP technology, a lot of convenient services (such as email, audio and video real-time distribution, mutual communication between a PC and a fixed network using the Internet, mutual connection between a cellular phone and a PC and the like) have been increasingly provided for users.

Accordingly, the devices which compose the network and provide these services and functions are installed with functions realized by more various software than ever. In order to realize a variety of functions while maintaining compatibility, a network must be built using devices configured so as to conform to a specific standard instead of devices configured according to a specification peculiar to each maker. In this case, since the configurations of devices constituting a network are common, the devices have the same disadvantages. When they are attacked by a network attacker, there is a possibility that all the devices may be similarly attacked. More particularly, a worm attack aiming at the fragility of software installed in a device is highly concerned.

If a network component is infected with a worm, a maintenance personnel examines the following items, analyzes them and determines whether the device is infected with a worm.

Claims from users: Access delay, reception of abnormal data, virus infection and the like.

Network traffic observation results: Rapid traffic increase/decrease.

Monitor of network components: Rapid change in processibility of components, rapid decrease of available memory capacity.

If it is determined that a component is infected, its service is stopped in order to minimize the spread of the damage, and an infected component is manually specified.

Therefore, it takes a lot of time and labors to complete its treatment and it incurs the increase of a maintenance cost. Simultaneously, it greatly damages the benefits of users. Furthermore, if fragility is detected in a network operation system, there is a possibility that the reliability of the network business may be lost and the business must be withdrawn.

VoIP and IP Centrex services utilizing a current SIP (session initiation protocol) technology and further a move to incorporate a cellular phone using IMS (IP multimedia subsystem), a wireless LAN, a broadband, a PSTN (public switched telephone network) are also being activated.

There is a strong tendency that a general-purpose product is used for equipment constituting such a network in order to build such a network at a low cost and in a short time and that general-purpose software is also used for software controlling services. Software fragility is predicted to increase compared with the conventional network, and it is also anticipated that software is infected with a worm which attacks its fragility. The influence of its infection will be great for users compared with the conventional network.

Since additional services can be realized by further linking networks, it is anticipated that unique highly public networks (for police, fire fighter, ship, employment agency, etc.) which had been realized using unique devices and software are also damaged.

Furthermore, since a variety of networks are incorporated, it is predicted to take more time compared with the conventional case to specify an infected device. In some case, there will be worm infection about which no user claims.

Such a situation causes the following problems.

Problem 1: Worm infection must be early detected and treated.

Problem 2: If an infected device is specified, the device must be prevented to be used as soon as possible in order to minimize the spread of damage.

Problem 3: Since its influence on highly public police, fire fighter and ship networks easily relates to a human life, such services must be re-started as soon as possible.

Generally, it is anticipated that worm infection is caused by an illegal access by an infected server, or an attack to fragile software, based on the publication of fragile information as a trigger. However, in addition to it, it is also anticipated that it attacks the fragility of a network operation procedures.

Specifically, the following infection forms are considered.

(1) Infection from Maintenance Terminal

A maintenance terminal is infected with some virus or a malicious maintenance personnel intentionally transmits a virus. Then, the terminal is connected to a network, and the infection spreads via a maintenance protocol, such as an FTP, a SNMP, etc.

(2) Infection Due to the Malicious Use of Call Setting Protocol

Virus software is stored in the option setting of a protocol, and the software is transmitted to a server. Upon receipt of the software, the server is infected with the virus when analyzing its contents.

If a device is infected with the virus thus, the following influences can be considered.

1. In the Case where Service Control Software is Infected (1) It is anticipated that the virus software itself activates based on the processing unit with an infected fragile part. Therefore, it is anticipated that an operation becomes the one which falsifies a process to be operated and is activated prior to the infected software. Thus, since a lot of unmanaged processes are generated in a device and a lot of memory is used in the device, it is expected that its control memory is exhausted, its performance degrades and an abnormal process request is issued to outside the device.

(2) It is anticipated that the virus software activates a process start request regardless of the state of a destination of the request. Although in the regular termination, generally the state of the destination is checked and a useless call setting is suppressed, in the virus software aiming to affect the system, communication goes on regardless of the state of the destination. Therefore, the communication performance of the user device degrades and the device is knocked down.

(3) Notification of a service start request to unspecified number of users

The unspecified number of users are activated using the following mechanism.

(a) Phone numbers are mechanically generated (for example, in ascending order from a subscriber number 0000) and calls are originated.

(b) Calls are consecutively originated to a learned specific phone number.
(c) If a lot of calls are originated at random, there is a possibility that the communication of a user using a service is disturbed (disconnected) or that the entire network enters into a congestion state due to the congestion of related devices triggered by the congestion of an infected device and the spread of the influence.
(4) The virus software generates false origination information and attempts to terminate calls many specified/unspecified subscribers. Therefore, disguise, the paralysis of highly urgent service, such as a police service, a fire fighter service, a shipping service, etc., and the like are caused.
(5) No process requests can be received from outside due to the virus software. Therefore, service for users are temporarily stopped or no highly urgent request can be issued.

2. In the Case where Maintenance Control Software is Infected (1) There is a possibility that the virus software disguises itself as a maintenance command, generates a command image, disguises to input a lot of commands, exhausts system resources and disturbs the input of a normal command. There is a possibility that it disguises the management number and port number of the maintenance terminal in its internal process.
(2) The virus software can freely copy an inputted command and execute it a plurality of times at one time to disturb the maintenance operation. Furthermore, it is also anticipated that it continues to independently perform a process, according to the copied information. In the case of an IP-related command, it is also anticipated that the server is disconnected from the network. If the process is consecutively performed, a normal maintenance request cannot be received. In that case, the maintenance function is congested and an important system notice is not delivered to the maintenance personnel to stop the maintenance work.
(3) It is anticipated that when an inputted command is converted into an internal expression, the virus software abnormally terminates the inputted command by abnormally converting it to disturb the maintenance operation.
(4) In order that the virus software confuses the maintenance, it is anticipated to issues a lot of alarms.

Reference 1 discloses a prior art for detecting the occurrence of such a worm or virus. Reference 1 discloses a technology for detecting the possibility of the virus occurrence by detecting the use of a normally unused exceptional port, the generation of an incomplete packet, the abnormal increase of the amount of communication, the abnormal increase of the amount of errors and the like.

Reference 1: Japanese Patent Application Publication No. 2003-241989

However, in the conventional worm/virus occurrence detecting method, the worm/virus occurrence can be detected only after a virus conducts communication via a network and a failure occurs.

SUMMARY OF THE INVENTION

It is an object of the present invention to provide a worm infection detecting device capable of early detecting a worm-infected device and preventing other devices from its infection.

The worm infection detecting device of the present invention detects the worm infection of a device for executing a program. The detection device comprises a route storage unit for storing the correct processing route in the case where a program is executed, a route recording unit for recording an actual processing route while a program is actually executed and a worm infection determining unit for determining whether a device is infected with a worm, based on whether the route recorded by the route recording unit coincides with the route stored in the route storage unit.

According to the present invention, early detecting that a device constituting a network is infected with a worm and disconnecting the infected device from the network, the stable operation of the entire network can be realized.

BRIEF DESCRIPTION OF THE DRAWINGS

FIG. 1 shows the configuration of the worm infection detecting device in the first preferred embodiment of the present invention.

FIG. 4 is a flowchart showing the final route determining process in the first preferred embodiment of the present invention.

FIG. 7 is a flowchart showing the intermediate route determining process in the third preferred embodiment of the present invention.

FIG. 8 is a flowchart showing the final route determining process in the third preferred embodiment of the present invention.

DESCRIPTION OF THE PREFERRED EMBODIMENT

Figure 2A:
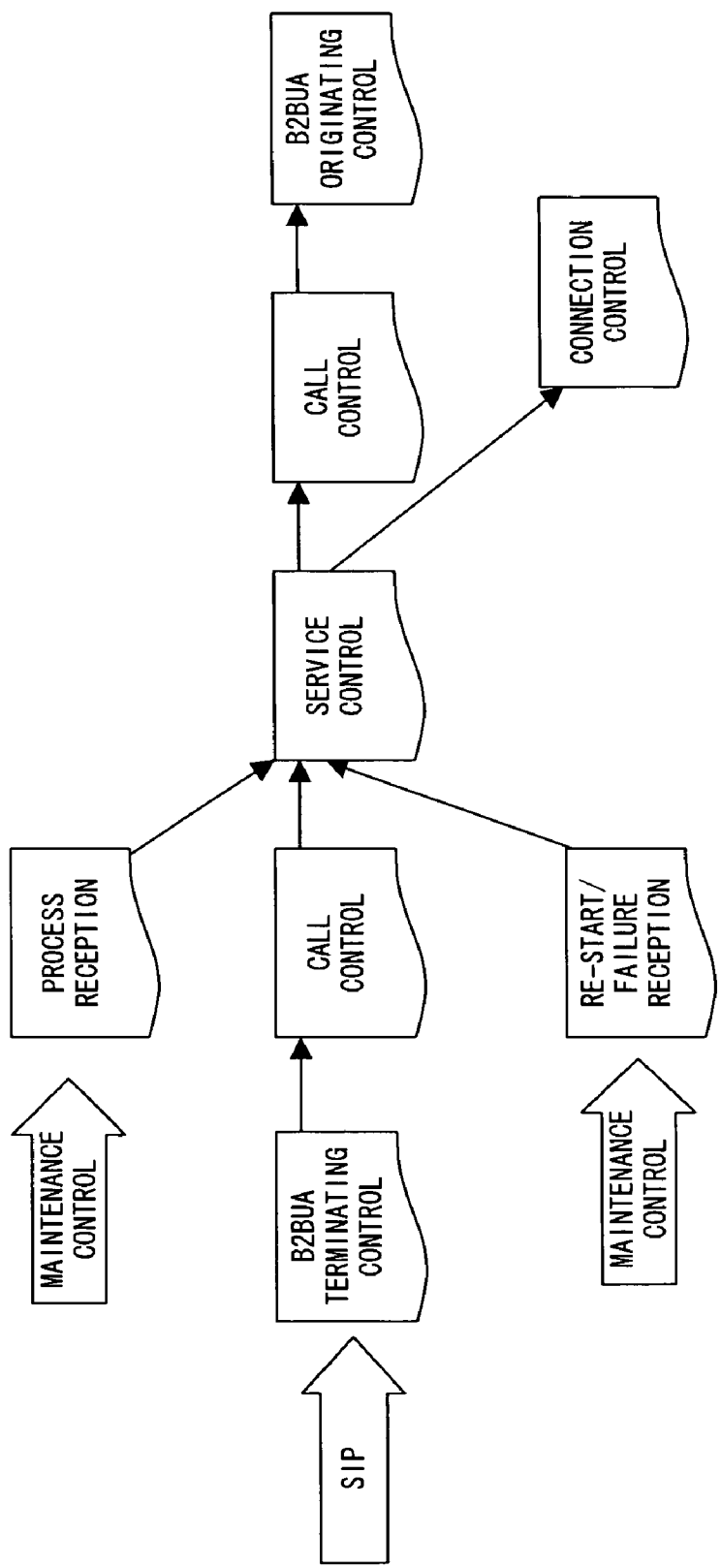
FIGS. 2A and 2B are examples of the flowchart of the entire process in the first preferred embodiment of the present invention.

The preferred embodiments of the present invention presume network devices controlled by software and an information communication network which is composed of the network devices and is based on an IP technology. As a device which may be infected with a worm, there is a network device, such as a server, a router and the like.

Against the worm infection, the following countermeasures are taken.

Countermeasure 1: A mechanism for autonomously determining whether a device is infected with a worm is mounted. After detecting worm infection, the mechanism notifies the maintenance personnel of it.

Countermeasures 2: If the device is specified as a worm-infected device, the mechanism autonomously disconnects it from the IP network being a communication infrastructure and notifies the maintenance personnel of the disconnection.

Firstly, the followings are provided.

(1) A routing information database for storing in advance predicted processing route information.
(2) A worm infection control function to receive the notice of worm infection, to disconnect the server from the network and to notify the maintenance personnel of the infection.

When software is activated on the device, the software operation composed of modules is traced and the normality of the processing route that processing operation has followed is checked according to the pre-stored routing information. If as a result of the check, it is determined that it is abnormal, a request to notify the abnormality is issued to the worm infection control function to notify the maintenance terminal that the abnormality has been detected. The worm infection control function cuts off the communication port used for the communication between the devices (for example, communication between the server and the router), in response to the request, and notifies the maintenance personnel of the abnormality.

By performing the above-described process at the top of each software control, the spread of worm-infected software can be expected to suppress. In this case, information to be stored as routing information expresses a process flow using topology and manages processes corresponding to the start, relay, branch and completion of the topology in a pair with a process request type, according to requested processing patterns (a processing pattern by a call processing procedure, a processing pattern by a maintenance procedure, a processing pattern by a re-start processing procedure and a processing pattern by a processing procedure at the time of encountering a failure).

FIG. 1 shows the configuration of the worm infection detecting device in the first preferred embodiment of the present invention.

The worm infection detecting device in the first preferred embodiment of the present invention can be realized by installing software in a device whose worm infection is monitored as a program.

A re-start/failure receiving unit 10 receives instructions on the re-start process and failure process of a worm-infected device from a system monitor processing unit. A maintenance process receiving unit 11 receives instructions on a maintenance process from the maintenance terminal. A process reception processing unit 12 inputs the instructions from the re-start/failure receiving unit 10 and maintenance process receiving unit 11. Simultaneously, the process reception processing unit 12 analyzes the contents of a request transmitted by the SIP message of an SIP message receiving/analyzing unit 19, notifies a control scenario unit 15 of activation scenario information being information about what process should be activated and obtains activation table information. The SIP message receiving/analyzing unit 19 receives an SIP message, analyzes the normality of the received message and transfers the message to the process reception processing unit 12.

A process execution unit 13 executes a process according to the activation table received by the process reception processing unit 12. The process execution unit 13 performs the respective control of a pseudo-process analysis unit 16-1 and a pseudo-process generation unit 16-2, which are described later, as well as B2BUA (back-to-back user agent) terminating control, B2BUA originating control, call control, service control, connection control, an intermediate process determination process and a final process determination process. An SIP message generation/transmission processing unit 20 generates an SIP message, according to the request of the B2BUA originating control process and transmits the SIP message.

According to the execution results of the intermediate and final process determining processes, a worm infection control unit 14 cuts off the communication port and notifies the maintenance terminal of the worm infection. The control scenario unit 15 manages the process activation table as a call setting scenario. The process activation table describes the order of processes to be activated. In FIG. 1, it describes an intermediate process determining process, B2BUA terminating control, an intermediate process determining process, call control, an intermediate process determining process, service control, an intermediate process determining process, call control, an intermediate process determining process, B2BUA originating control and a final process determining process in that order. The control scenario unit 15 stores a table for managing a maintenance process order and the activation process as s maintenance process scenario, a table for managing the re-start of a process for work infection, a failure process order and an activation process as a re-start/failure process scenario, a table for describing the activations and their order of the pseudo-process generation unit 16-2 and pseudo-process analyzing unit 16-1 as a pseudo-process scenario, which is described later.

A database 17 stores routing information, abnormal routing information and HOP information, and provides data for determining whether a device is infected with a worm in the final process determining process. A database 18 stores pseudo-process monitor information and pseudo-patterns, and provides data for attempting to detect a worm by a pseudo-process.

Figure 2B:
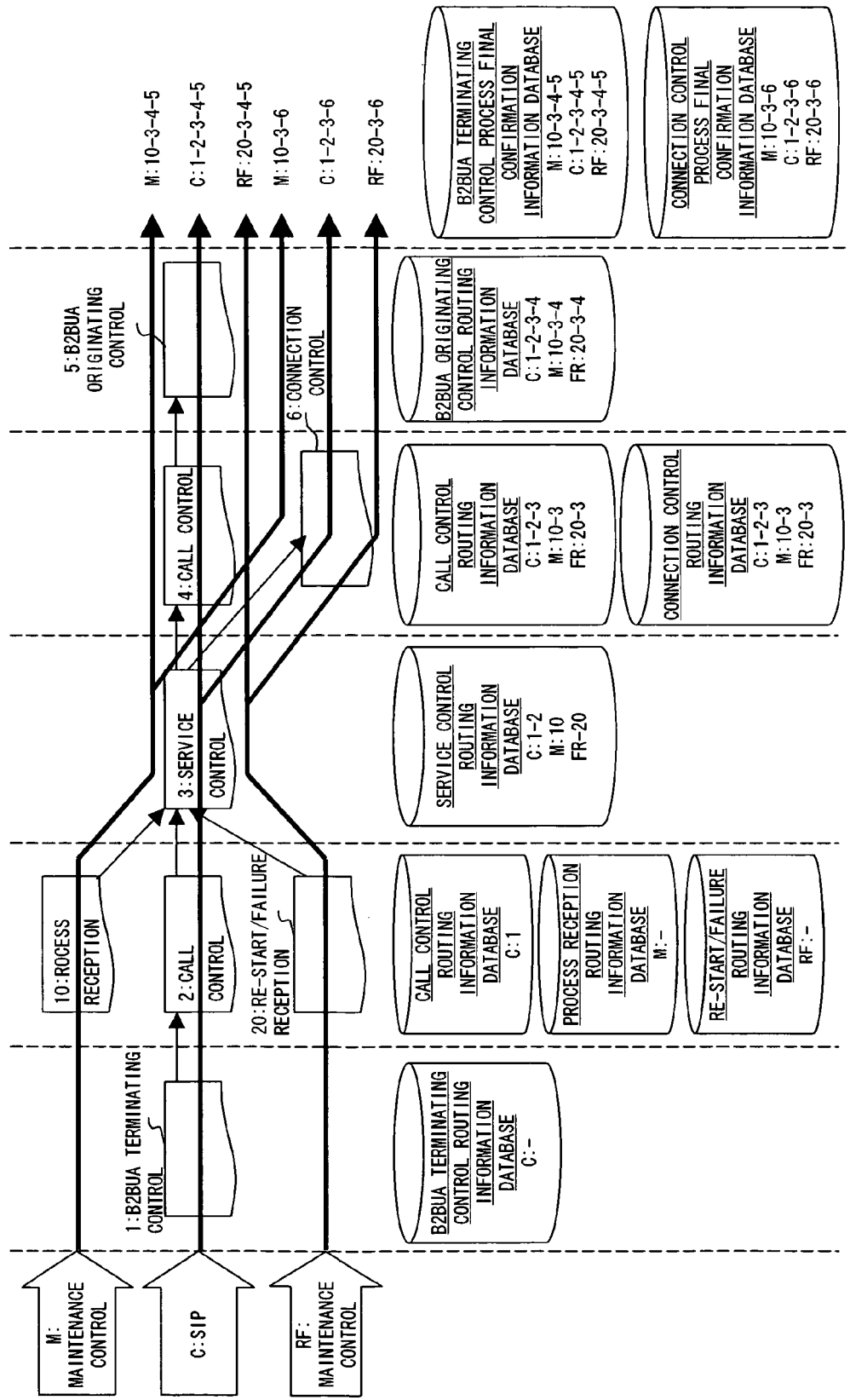

FIGS. 2A and 2B are examples of the flowchart of the entire process in the first preferred embodiment of the present invention.

FIG. 2A shows an example of the route pattern of this process. Each block represent each process unit, and this is applied to the following descriptions of all the preferred embodiments. As an ordinary process flow, a request by an SIP message is notified to the B2BUA terminating control process, the process proceeds from the call control to service control, call control and B2BUA originating control. From the service control process, the process proceeds to the connection control. In this case, the process flow of maintenance control proceeds to the service control via the process receiving process, and the process flow of other maintenance control proceeds to the service control process via the re-start/failure receiving process.

FIG. 2B shows an example of routing information in the case of the route pattern shown in FIG. 2A. In the case of process flow shown in FIG. 2A, there are six types of flows as the route pattern. Each control process is provided with an identifier, and a sequence of the numbers indicates a route. Each control process is provided with a corresponding routing information database. Since the B2BUA terminating control process whose identifier is "1" is the first process of the flow, it has no identifier to be registered. Similarly, routing information data corresponding to the process reception with an identifier "10" and the re-start/failure reception with an identifier "20" have also no registered identifiers. However, since in the routing information database corresponding to the call control process with an identifier "2", the identifier of the previous control process in the route is "1", "1" is registered. Similarly, the sequence of numbers of the identifier for indicating all routes to the service control process with an identifier "3" are set in a service control routing information database. In the case of the call control process with an identifier "4", the same information is set in a call control routing database. In the case of the connection control process with an identifier "6", the same information is set in a connection control routing information database. In the case of the B2BUA originating control process with an identifier "5", the same information is set in a B2BUA originating control routing information database. Then, a B2BUA terminating control process final confirmation information database and a connection control process final confirmation information database are provided in accordance with the last exit of the process flow.

These routing information databases should be installed in advance, based on the knowledge of a program designer or the like when a program to be monitored is installed in the device.

Figure 3:
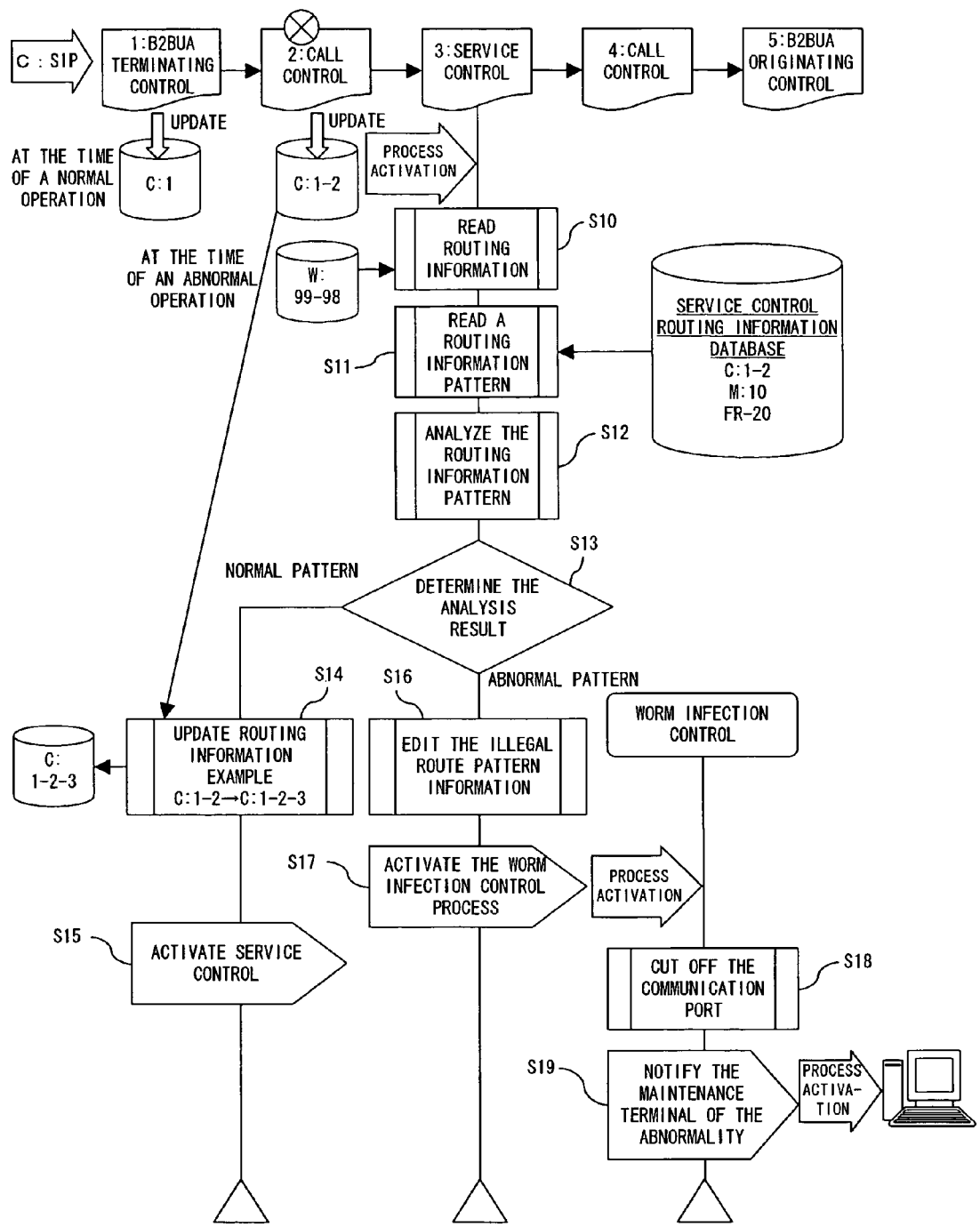
FIG. 3 is a flowchart showing the intermediate route determining process in the first preferred embodiment of the present invention.

FIG. 3 is a flowchart showing the intermediate route determining process in the first preferred embodiment.

In FIG. 3, a failure occurs in the call control process. Therefore, as to the process of the present invention which is activated before each process, the process activated in relation to only the service control process is shown.

When an ordinary process occurs, the process is normally performed in the B2BUA terminating control process with identifier "1", and the identifier "1" is registered in the routing information database as the routing information of a route C. This routing information database sequentially stores routing information along the process flow and the routing information is transferred between control processes along the process flow. It is assumed that a failure occurs in the subsequent call control process with identifier "2". In this case, the routing information database store abnormal routing information due to the influence of a worm. Then, prior to the subsequent service control process with identifier "3", the worm infection detecting process in this preferred embodiment of the present invention is performed. Firstly, in step S10, the routing information updated by the call control process with identifier "2" is read. In step S11, a routing information pattern is read from the service control routing information database. In step S12, the routing information generated by the call control process with identifier "2" is compared with the routing information read from the service control routing information database and its route pattern is analyzed. In step S13, the analysis result of the routing pattern is determined. If the route pattern is normal, in step S13, the routing information of the routing information database is updated (its own identifier is newly added to the routing information composed of a sequence of numbers). In step S15, the service control process is activated. If in step S13 it is determined that the route pattern is illegal, that is, it differs from the pattern at the time of a normal operation, stored in the service control routing information database, in step S16, the illegal route pattern information is edited (is rewritten into a normal routing pattern). In step S17, it is determined that the device is infected with a worm and the worm infection control process is activated. In step S18, the worm infection control process cuts off the communication port of the device infected with a worm. In step S19, it notifies the maintenance terminal of the abnormality.

FIG. 4 is a flowchart showing the final route determining process in the first preferred embodiment.

When the process flow reaches its end, the B2BUA originating control process with identifier "5" generates final routing information. In step S20, this information is read. In step S21, normal routing information is read from the B2BUA terminating control process final confirmation information database. In step S22, the patterns read in steps S20 and S21 are compared and analyzed. In step S23, the analysis result is determined. If the analysis result is normal, in step S24, the process normally terminates. If the analysis result is illegal, in step S25, the illegal route pattern information is edited. In step S26, the worm infection control process is activated. In step S27, the worm infection control process cuts off the communication port. In step S28, it notifies the maintenance terminal of the abnormality.

The second preferred embodiment is a method provided with "a worm pattern recording function" to learn doubtful patterns, for specifying a worm-infected device whose worm infection is to be detected in a shorter time in the above-described first preferred embodiment.

Figure 5:
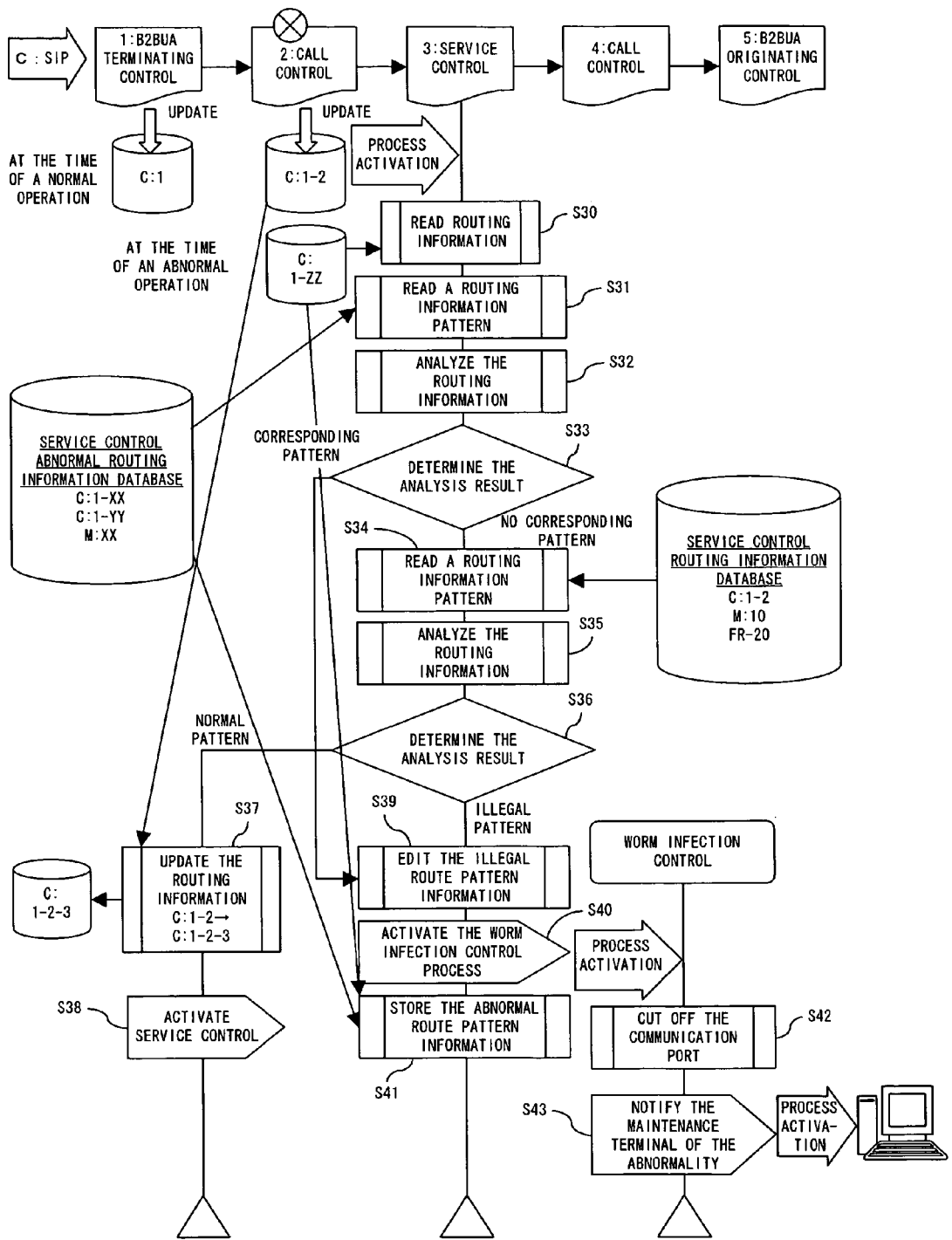
FIG. 5 is a flowchart showing the intermediate route determining process in the second preferred embodiment of the present invention.

FIG. 5 is a flowchart showing the intermediate route determining process in the second preferred embodiment of the present invention.

In FIG. 5 too it is assumed that a failure occurs in the call control process with identifier "2".

Although in the second preferred embodiment too, the detection process in the second preferred embodiment of the present invention is activated prior to each control process, the service control process with identifier "3" is focused and described. Before the service control process with identifier "3" is activated, the detection process in the second preferred embodiment of the present invention is activated. In step S30, routing information generated along the process flow is read. In step S31, the known abnormal pattern is read from the service control routing abnormal routing information database. In step S32, the route pattern is analyzed, and it is checked whether the routing information read in step S30 coincides with the abnormal route pattern read in step S31. In step S33, the analysis result is determined. If as a result of the analysis, there is a corresponding pattern, the process proceeds to step S39. If as a result of the analysis, there is no corresponding pattern, in step S34, a route pattern at the time of a normal operation is read from the service control routing information database. In step S35, the route pattern is analyzed. In step S36, the analysis result is determined. If as a result of the analysis, the pattern is normal, in step S37, the routing information is updated. In step S38, the service control process is activated. If as a result of the analysis, the illegal pattern is found, in step S39, the illegal route pattern information is edited. And in step S40, it is determined that the device is infected with a worm and the worm infection control process is activated. In step S41, the abnormal route pattern is stored in the service control abnormal routing information database. In step S42, the worm infection control process cuts off the communication port of the device infected with a worm. In step S43, it notifies the maintenance terminal of the abnormality.

In the third preferred embodiment, detection accuracy is improved by using process start information and process hop number information in the first preferred embodiment, and a device infected with a worm is specified. The hop is updated by providing each processing unit with an update process. The number of valid hops is automatically extracted according to routing information, and its validity is determined about the range between the extracted minimum and maximum values.

Figure 6:
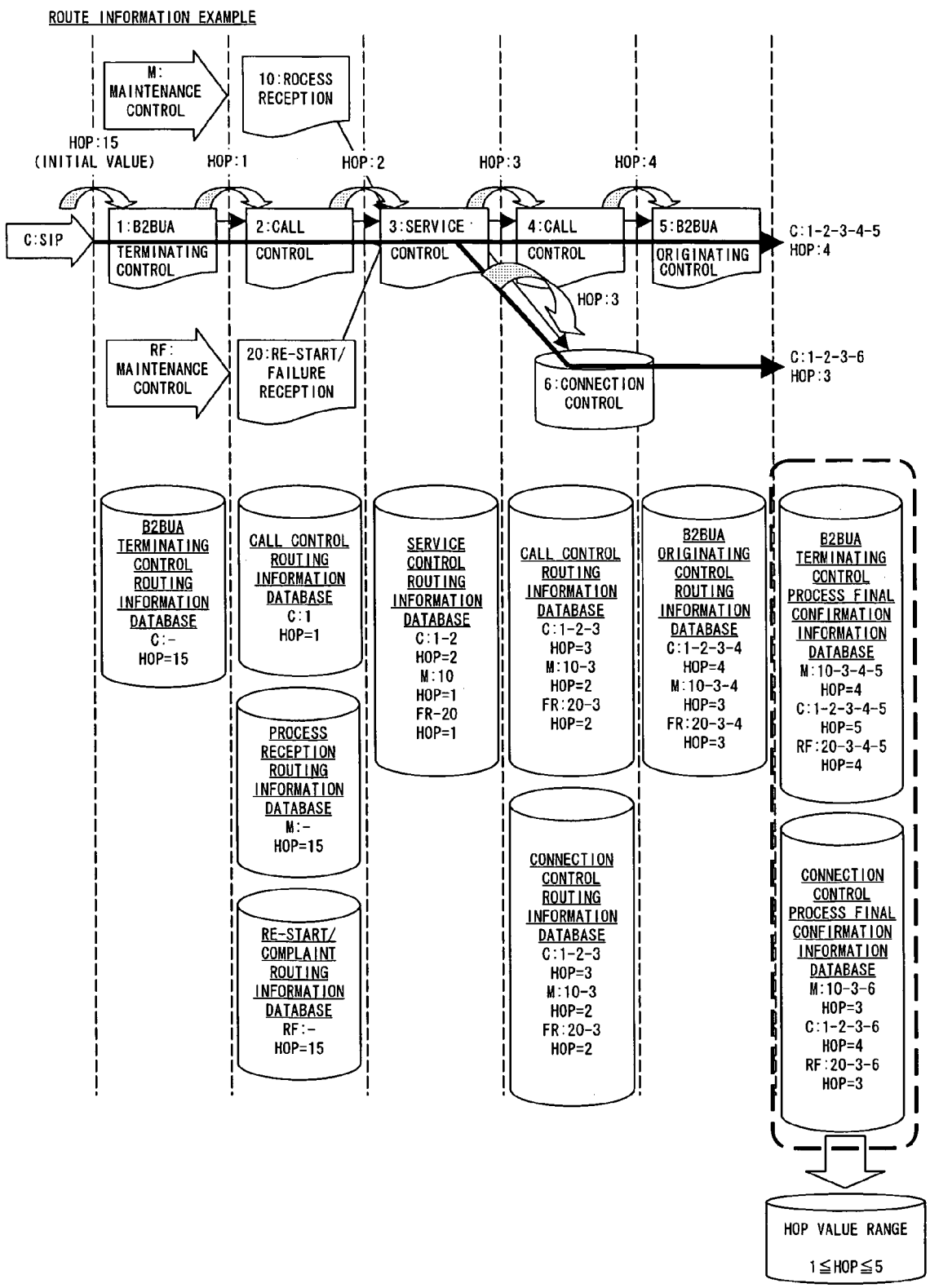
FIG. 6 shows an example of the route information in the case of the routing pattern of the third preferred embodiment of the present invention.

FIG. 6 shows an example of the route information in the case of the routing pattern of the third preferred embodiment of the present invention.

In the case of process flow shown in FIG. 6, there are six types of flows as the route pattern. Each control process is provided with an identifier, and the sequence of numbers indicates a route. Each control process is provided with a corresponding routing information database. Since the B2BUA terminating control process whose identifier is "1" is the first process of the flow, it has no identifier to be registered. However, in the B2BUA terminating control process, a HOP value indicating how many control processes the process passes through in the process flow is set as its initial value. The HOP value is incremented in order starting from 1 every time the process passes through each control process. Similarly, although routing information data corresponding to the process reception with an identifier "10" and the re-start/failure reception with an identifier "20" have also no registered identifiers, the HOP value is set as its initial value. However, since in the routing information database corresponding to the call control process with an identifier "2", the identifier of the previous control process in the route is "1", "1" is registered, and the HOP value is set to "1". Similarly, the sequence of numbers of an identifier for indicating all routes to the service control process with an identifier "3" and the HOP value of each route are set in a service control routing information database. In the case of the call control process with an identifier "4", the same information is set in a call control routing database. In the case of the connection control process with an identifier "6", the same information is set in a connection control routing information database. In the case of the B2BUA originating control process with an identifier "5", the same information is set in a B2BUA originating control routing information database. Then, a B2BUA terminating control process final confirmation information database and a connection control process final confirmation information database are provided in accordance with the last exit of the process flow. Information for setting the range of the HOP value is also stored.

These routing information databases should be installed in advance, based on the knowledge of a program designer or the like when a program to be monitored is installed in the device.

FIG. 7 is a flowchart showing the intermediate route determining process in the third preferred embodiment of the present invention.

In FIG. 7, as in FIGS. 3 and 5, a failure occurs in the call control process with identifier "2" and the failure is detected in the detection process activated prior to the service control process.

Firstly, in step S50, HOP information is read. Then, in step S51 it is determined whether the HOP value is appropriate, that is, the HOP value is within a prescribed range. If in step S52 it is determined that the HOP value is within the prescribed range, in step S53, routing information is read. In step S54, a routing information pattern is read from the service control routing information database. In step S55, its route pattern is analyzed. If in step S56 it is determined that the route pattern is normal, in step S57, the routing information and HOP value are updated. In step S58, the service control process is activated. If in step S56 it is determined that the route pattern is abnormal, in step S59 the illegal route pattern information is edited. In step S60, it is determined the device is infected with a worm, and the worm infection control process is activated. If in step S52 it is determined that the HOP value is not within the prescribed range, in step S61 the illegal route pattern information is edited. In step S62, it is determined the device is infected with a worm, and the worm infection control process is activated. In step S63, the worm infection control process cuts off the communication port of the device infected with a worm. In step S64, it notifies the maintenance terminal of the abnormality.

FIG. 8 is a flowchart showing the final route determining process in the third preferred embodiment of the present invention. In step S70, when the B2BUA originating control process being the final control process terminates, HOP information is read. In step S71, it is determined whether the HOP value is within the prescribed range. If in step S72 it is determined that the HOP value is not within the prescribed range, the process proceeds to step S78. If in step S72 it is determined that the HOP value is within the prescribed range, in step S73, routing information is read from the routing information database. In step S74, routing information pattern at the time of a normal operation is read from the B2BUA terminating control final confirmation information database. In step S75, its route pattern is analyzed. In step S76, as a result it is determined that the routing information is normal, in step S77, the process normally terminates. If in step S76 it is determined that the routing information is abnormal, in step S78, the illegal route pattern is edited and is rewritten into normal one. In step S79, the worm infection control process is activated.

In step S80, the worm infection control process cuts off the communication port of the device infected with a worm. In step S81, it notifies the maintenance terminal of the abnormality.

The fourth preferred embodiment can be obtained by adding to the third embodiment a pseudo-process generation unit for performing a pseudo-process in order to regularly monitor the normality of the process and an analysis unit for analyzing its result. The fourth preferred embodiment detects worm infection when a device is infected with a worm discarding the process.

Figure 9:
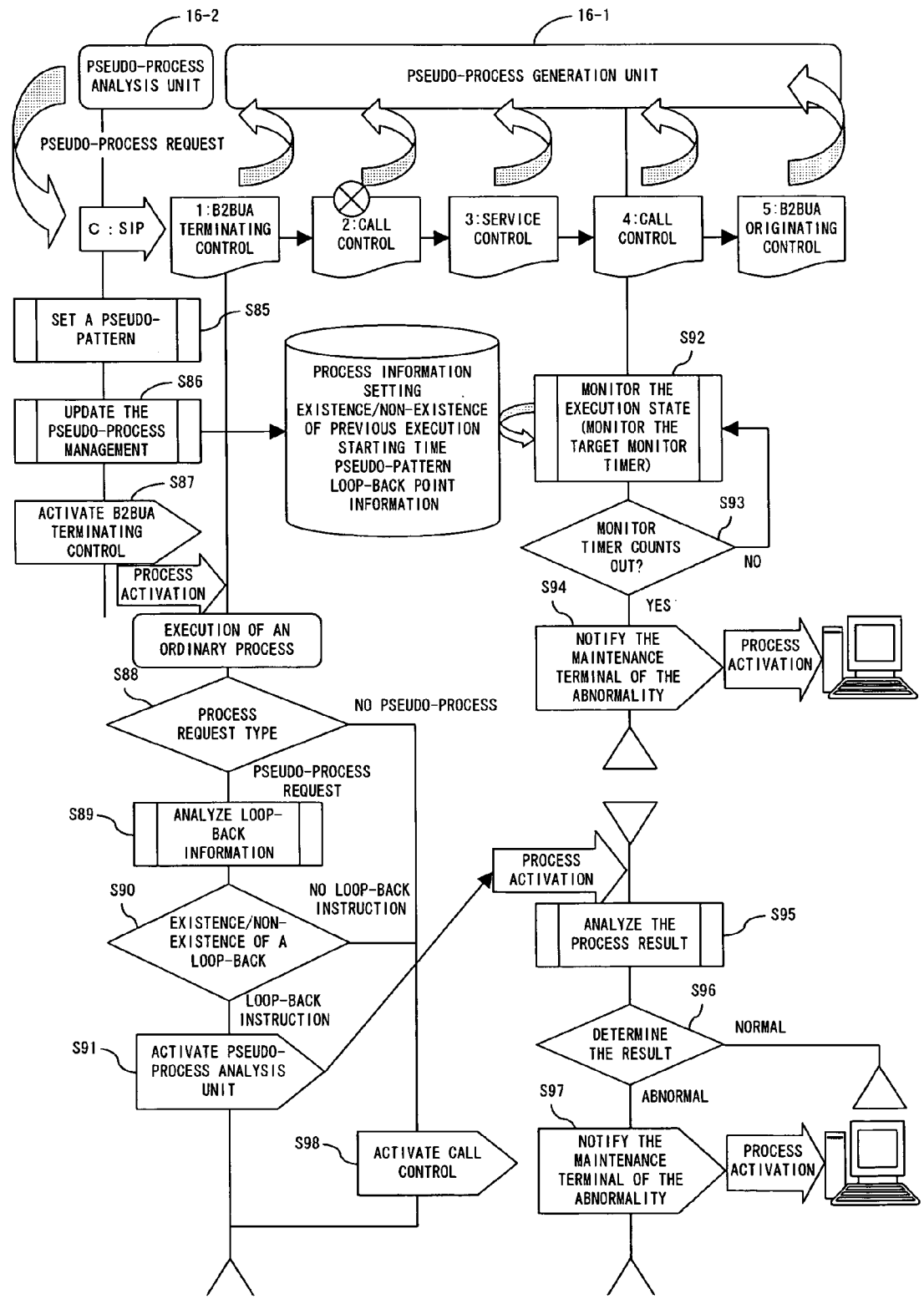
FIG. 9 is the flowchart of the entire process in the fourth preferred embodiment of the present invention.

FIG. 9 is the flowchart of the entire process in the fourth preferred embodiment of the present invention.

When detecting a worm, the fourth preferred embodiment performs a pseudo-process to check whether a program is infected with a worm, instead of inspecting an actual process flow, and analyze its result to detect a worm. Firstly, the pseudo-process generation unit 16-2 issues a pseudo-process request to the B2BUA terminating control process being the first process. Firstly, in step S85, a user sets a pseudo-pattern. The pseudo-pattern setting sets the contents of a process of checking whether a program is infected with a worm. Then, in step S86, pseudo-process management information is updated. The pseudo-process management information includes the setting of process information, existence/non-existence of previous execution, starting time, a pseudo-pattern, loop-back point information and the like. The loop-back point is a process stoppage point where, for example, the service control process with identifier "3" is stopped, the process results till then are obtained and analyzed, and the process is repeated again from the beginning, based on the analysis result, instead of all processes ranging from the B2BUA terminating control with identifier "1" up to the B2BUA originating control with identifier "3". In step S87, the pseudo-process generation unit 16-2 activates the B2BUA terminating control process.

In step S88, when being activated by the pseudo-process generation unit 16-2, the B2BUA terminating control process determines its process request type. If in step S88 it is determined that no pseudo-process is required, in step S98, the call control process is activated. If in step S88 it is determined that a pseudo-process is required, in step S89, loop-back information is analyzed. In step S90, it is determined whether loop-back is instructed in the process. If in step S90 it is determined that no loop-back is instructed, the process proceeds to step S98. If in step S90 it is determined that loop-back is instructed, in step S91, the pseudo-process analysis unit 16-1 is activated.

In step S95, when being activated by the loop-back instruction, the pseudo-process analysis unit 16-1 analyzes the process result. In step S96, it determines the result. If there is abnormality, in step S97 it notifies the maintenance terminal of the abnormality. If there is no abnormality, the process terminates.

The pseudo-process analysis unit 16-1 monitors the execution of a pseudo-process pattern even when no loop-back is instructed. If no process advances beyond the specified time, it determines that the device is infected with a worm. In step S92, it monitors its execution state, that is, a monitor timer (in which time-out is set in an execution time) of each process. In step S93, it determines whether the monitor timer counts out. If the monitor timer does not count out, it continues to monitor the monitor timer. In step S94, when the monitor timer counts out, it notifies the maintenance terminal of its abnormality.

What is claimed is:

1. A detection device for detecting that a device in which a program is executed is infected with a worm, comprising:
   a route storage unit to store a processing route in which the program is correctly executed, the processing route being a path of a process flow when the program is executed correctly in the device connected to a network, by which the program is executed;
   a route recording unit to record an actual processing route in the device connected to the network, by which the program is executed while the program is actually being executed;
   a worm infection determining unit to determine whether the device is infected with a worm, by determining whether the route recorded by the route recording unit, when the program is actually being executed, coincides with the route stored in the route storage unit when the program not infected by a worm is executed; and
   an abnormal route storage unit to store a processing route when a device is infected with a worm,
   wherein
   the worm infection determining unit determines that the device is infected with a worm when a route recorded in the route recording unit coincides with a route stored in the abnormal route storage unit.

2. The detection device according to claim 1, further comprising:
   a communication port cut-off unit to cut off a communication port of the device when it is determined that the device is infected with a worm.

3. The detection device according to claim 1, further comprising:
   a notification unit to notify a maintenance terminal of the device that the device is infected with a worm when it is determined that the device is infected with a worm.

4. A detection device for detecting that a device in which a program is executed is infected with a worm, comprising:
   a route storage unit to store a processing route in which the program is correctly executed, the processing route being a path of a process flow when the program is executed correctly in the device connected to a network, by which the program is executed;
   a route recording unit to record an actual processing route in the device connected to the network, by which the program is executed while the program is actually being executed;
   a worm infection determining unit to determine whether the device is infected with a worm, by determining whether the route recorded by the route recording unit coincides with the route stored in the route storage unit; and
   a HOP value storage unit for storing a HOP value indicating how many process units constituting a process is performed by executing the program, wherein
   when the HOP value is within a prescribed range, the worm infection determining unit determines that the device is infected with a worm.

5. A detection device for detecting that a device in which a program is executed is infected with a worm, comprising:
   a route storage unit to store a processing route in which the program is correctly executed, the processing route being a path of a process flow when the program is executed correctly in the device connected to a network, by which the program is executed;
   a route recording unit to record an actual processing route in the device connected to the network, by which the program is executed while the program is actually being executed;
   a worm infection determining unit to determine whether the device is infected with a worm, by determining whether the route recorded by the route recording unit coincides with the route stored in the route storage unit; and
   a pseudo-process request unit to issue a pseudo-process request to the program,
   wherein
   the worm infection determining unit determines that the device is infected with a worm, in response to the process request issued to the program by the pseudo-process request unit.

6. The detection device according to claim 5, further comprising:
   a timer to count an elapsed time of the process for each process unit of the process performed by the program,
   wherein
   when the timer times out, the timer notifies a maintenance terminal that the device is infected with a worm.

7. The detection device according to claim 5, wherein the pseudo-process request can instruct execution stoppage for each process unit performed by the program.

8. A detection method executed by a computer for detecting that a device in which a program is executed is infected with a worm, comprising:
   storing a processing route in which the program is correctly executed, the processing route being a path of a process flow when the program is executed correctly in the device connected to a network, by which the program is executed;
   recording an actual processing route in the device connected to the network, by which the program is executed while the program is actually being executed;
   determining whether the device is infected with a worm, by determining whether the recorded route, when the program is actually being executed, coincides with the stored route when the program not infected by a worm is executed; and
   storing a HOP value indicating how many process units constituting a process are performed by executing the program, wherein
   when the HOP value is within a range, determining that the device is infected with a worm.

9. A non-transitory computer readable storage medium storing a program for enabling a computer to realize a detection method for detecting that a device in which a program is executed is infected with a worm, the detection method comprising:
   storing a processing route in which the program is correctly executed, the processing route being a path of a process flow when the program is executed correctly in the device connected to a network, by which the program is executed
   recording an actual processing route in the device connected to the network, by which the program is executed while the program is actually being executed;
   determining whether the device is infected with a worm, by determining whether the recorded route, when the device is actually being executed, coincides with the stored route when the device not infected by a worm is executed and storing a HOP value indicating how many process units constituting a process are performed by executing the program, wherein when the HOP value is within a range, determining that the device is infected with a worm.

10. The non-transitory computer readable storage medium storing a program for enabling a computer to realize a detection method according to claim 9, wherein the detection method further comprises:

issuing a pseudo-process request to the program, and wherein determining includes determining a worm infection in response to the process request issued to the program.

11. The non-transitory computer readable storage medium storing a program for enabling a computer to realize a detection method according to claim 10, wherein the detection method further comprises:

counting an elapsed time of the process for each process unit of the process performed by the program, and notifying, at a time limit, a maintenance terminal that the device is infected with a worm.

12. The non-transitory computer readable storage medium storing a program for enabling a computer to realize a detection method according to claim 11, wherein the detection method further comprises instructing, with the psedo-process request, an execution storage for each process unit performed by the program.

13. The method according to claim 8, further comprising:

issuing a pseudo-process request to the program, and wherein determining includes determining a worm infection in response to the process request issued to the program.

14. The method according to claim 13, further comprising:

counting an elapsed time of the process for each process unit of the process performed by the program, and notifying, at a time limit, a maintenance terminal of that the device is infected with a worm.

15. The method according to clam 14, further comprising:

instructing, with the psedo-process request, an execution storage for each process unit performed by the program.

* * * * *